United States Patent [19]

Voss

[11] Patent Number: 4,482,045

[45] Date of Patent: Nov. 13, 1984

[54] VALVE AND MATERIAL SUPPLY SYSTEM

[75] Inventor: Raymond G. Voss, Bartlesville, Okla.

[73] Assignee: Phillips Petroleum Company, Bartlesville, Okla.

[21] Appl. No.: 324,366

[22] Filed: Nov. 24, 1981

[51] Int. Cl.³ ............................................. B65G 33/14
[52] U.S. Cl. ..................................... 198/670; 198/671; 198/676; 366/76
[58] Field of Search ............... 198/657, 670, 671, 676; 222/502; 366/76, 77, 79

[56] References Cited

U.S. PATENT DOCUMENTS

| | | | |
|---|---|---|---|
| 2,770,837 | 11/1956 | Reifenhäuser | 198/670 X |
| 3,172,737 | 3/1965 | Whittington | |
| 3,265,778 | 8/1966 | Griffith | |
| 3,333,679 | 8/1967 | Zimmermann et al. | 198/672 X |
| 3,360,824 | 1/1968 | Schippers | 366/76 |
| 3,687,588 | 8/1972 | Smith | |
| 3,767,012 | 10/1973 | Jimi et al. | |
| 3,850,415 | 11/1974 | Hansen | 198/670 X |
| 3,868,093 | 2/1975 | Sokolow | 366/76 |

FOREIGN PATENT DOCUMENTS 311739 10/1932 Fed. Rep. of Germany .
1351751 5/1974 United Kingdom ................ 198/676

OTHER PUBLICATIONS

Cameron Iron Works, Houston Texas, Composite Catalog, 1962–1963, pp. 1094–1097.

Primary Examiner—Jeffrey V. Nase

[57] ABSTRACT

A valve and a system for transporting normally, non-fluent materials, including such valve, comprises a rotatable shaft, a housing surrounding at least part of the shaft and adapted to form an annular material transport space between the valve and the shaft, a worm-type transport formed on the shaft and extending to the interior surface of the housing and adapted to transport normally non-fluent material through the annular material transport space and a closure mounted on the shaft immediately adjacent one end of the worm-type transport and adapted to open and close the annular material transport space.

22 Claims, 7 Drawing Figures

VALVE AND MATERIAL SUPPLY SYSTEM

BACKGROUND OF THE INVENTION

The present invention relates to a valve means and a material supply system including such valve. More specifically, the present invention relates to a valve means and a supply system including such valve for the transfer of normally non-fluent materials.

In numerous manufacturing and material handling operations, it is necessary to transfer normally non-fluent materials, such as, liquids which are too viscous to flow at ambient conditions, comminuted solids, slurries of comminuted solids, materials which are solid and can be liquified at elevated temperatures, etc. The transport of such materials is not a problem, since the transport lnes can be heated to transport materials which are fluent at elevated temperatures and pressure can be applied to such materials, in the heated or unheated state, and to comminuted materials and slurries to cause them to flow. However, problems arise when flow is to be interrupted for some reason. When flow is interrupted, the material being transported will solidify, form plugs of comminuted solids or become viscous, particularly when the flow path includes a restriction, such as, the valve utilized to interrupt flow.

By way of specific example, it is often necessary to supply a lubricant to bearings and other relatively moving surfaces which are at an elevated temperature and accordingly require a lubricant which is normally non-fluent, i.e., is a liquid but too viscous to flow or be pumped at ambient temperatures or is a solid at ambient temperatures. In other instances it is necessary to lubricate relatively moving surfaces which are at elevated temperatures with materials which will not contaminate materials being handled by the system to be lubricated. For example, in certain instances, normally solid plastics or resins are being handled by the item to be lubricated and in order to prevent contamination of the material being handled, the lubricant supplied would also be a plastic or resin of the same character. The transmission of such non-fluent lubricants to the means to be lubricated could obviously become a serious problem. Obviously, the lubricant can be heated in the supply system and pumped or otherwise transported in the fluent condition. However, where such transmission is over a relatively long distance and/or the lubricant must be forced through a restriction, such as a valve or the like, the problem is aggravated. The solution to this problem also appears simple on the surface, since transmission lines can be steam traced or heated by wire-type resistance heaters. However, such heating of the transmission line and/or valves in some instances create problems, by adding heat to a means to be lubricated, which is maintained as cool as possible, or disrupting the heating of a means to be lubricated where such means is to be maintained at a specific accurate temperature, unless the lubricant supply system includes elaborate temperature control means. Even more of a problem is the fact, that when the item to be lubricated is shut down, the lubricant sets up or solidifies in the supply system transition means and/or valves. Again, heating of the supply system can in some instances provide a solution, but it is only a partial solution, since such heating to make the lubricant fluent can cause undue delays in start up and in some instances, even damage equipment such as pumps, which were started before the lubricant is sufficiently fluent to be pumped. These last problems will obviously be greatly aggravated where lubricant is to be supplied periodically or for short periods of time. Obviously maintaining the supply system is a heated condition for long periods of nonuse is highly inefficient.

It is therefore an object of the present invention to provide an improved apparatus for overcoming the above-mentioned and other problems of the prior art.

Another object of the present invention is to provide and improved valve means.

Yet another object of the present invention is to provide an improved injection valve means.

A further object of the present invention is to provide an improved system for transporting normally non-fluent materials.

Yet another object of the present invention is to provide an improved system for intermittently transporting a normally non-fluent material.

Another and further object of the present invention is to provide improved system for transporting a normally non-fluent lubricant to a means to be lubricated.

A still further object of the present invention is to provide an improved apparatus for intermittently delivering a normally non-fluent material from a source of such material to a point of use of such material.

SUMMARY OF THE INVENTION

The present invention relates to an improved valve means; including, a rotatable shaft, a housing surrounding at least a part of the shaft to form an annular material transport space between the shaft and the housing, a worm-type transport means formed on the outside of the shaft and extending to the interior surface of the housing and adapted to transport materials from one end of the annular material transport space to the other end of the material transport space, and, a closure means mounted on one end of the shaft immediately adjacent a corresponding end of the worm-type transport means and adapted to open and close the annular transport space between the shaft and the housing. A further aspect of the present invention comprises an intermittently operable material supply system incorporating the valve means.

The above and other objects and advantages of the present invention will be apparent from the following description when read in conjunction with the drawings.

DETAILED DESCRIPTION OF THE INVENTION

When used in accordance with the present invention, the term "bulk material" is meant to include solid materials capable of being comminuted or particulate solid materials, such comminuted or particulate materials suspended in a gaseous or liquid medium, liquids or combinations of the same.

The phrase "normally non-fluent materials", when utilized in the present invention, is meant to include bulk materials, as defined above, which are to be transported from one point to another, but which, under ambient conditions will not move between such points without the application of positive motive power thereto, particularly, such bulk materials which have a tendency to settle, agglomerate or soldify when not in transit.

While the present invention will be described in conjunction with its utilization to supply a specific bulk material to a particular utilization means, specifically a normally solid, polymeric lubricant to a bearing of an apparatus for removing solvent from a slurry of polymer in solvent, it is to be understood that such description is not to be considered limiting of the present invention but is for illustrative purposes only.

Figure 1:
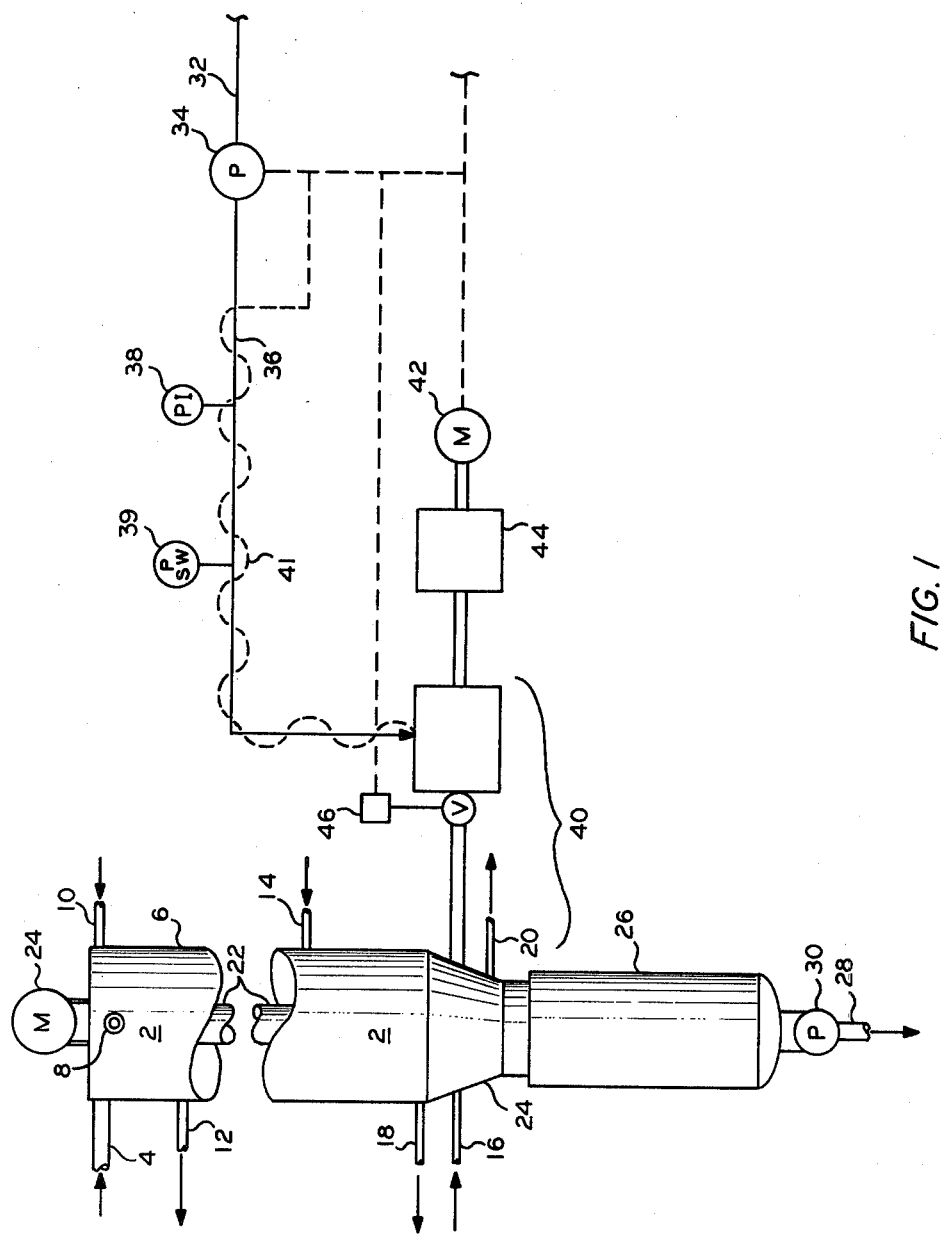
FIG. 1 diagramatically illustrates a system for the intermittent supply of materials, in accordance with the present invention.

FIG. 1 of the drawings shows the system of the present application in use on a solvent evaporation system which is adapted to vaporize solvent from a slurry of solids suspended in a solvent, such as a normally solid polymeric material suspended in the solvent. Concentrating apparatus 2 comprises inlet means 4 for the introduction of slurry of polymeric materials, in a solvent, to the apparatus. The inlet means 4 is designed to introduce the slurry so that it will form a film on the inner surface of a vertically disposed disengaging chamber 6, as a falling film. As the slurry descends down the inner surface of disengaging chamber 6, solvent is evaporated therefrom and discharged from the chamber through solvent outlet 8 by heating the chamber 6 to a progressively higher temperature from top to bottom. For example, a jacket type heater of the apparatus 2 can comprise a steam inlet 10 and a condensate outlet 12 oil inlets 14 and 16 and oil outlets 18 and 20, respectively. As solvent is evaporated from the slurry on the walls of the disengaging chamber 6, solid materials or polymeric material, will form on the inner walls of the chamber 6. Such solid materials are scraped from the interior walls of the chamber 6 by suitable scrapers mounted on a driven shaft 22 driven by a motor 24. Shaft 22 is provided with a bottom bearing in contact with a bearing support section 24 at the bottom of chamber 6. Under normal operating conditions, the bearing in section 24 is lubricated by the falling film of polymeric material descending down the walls of the chamber 6 and the bearing section 24. However, when slurry is not being supplied to the concentration apparatus 2 and shaft 22 is being rotated or during start-up after shut-down of the apparatus, the bearing and bearing chamber 24 must be supplied with a lubricant. Since the polymeric material being concentrated in the apparatus 2 would be contaminated by normal or conventional lubricants, lubricant supplied to the bearing unit 24 is the same polymeric material which is being concentrated by the apparatus 2, which is normally solid but which has been heated to a temperature sufficient to cause the polymer to be in a fluent condition. It is in the supply of this polymeric material to the apparatus 2 that the present material supply system and valve means of the present invention is directed. Below bearing chamber 24 of apparatus 2, the apparatus includes an accumulator tank 26 for collecting concentrated polymeric slurry. The concentrated slurry is discharged from concentrator 2 from line 28, assisted by pump 30.

The intermittent material supply system in this particular instance is designed to supply lubricant to the bearing in bearing chamber 24 of concentrator apparatus 2 and includes lubricant supply conduit 32 for supplying polymer from a source (not shown) in a heated, fluent condition or even a part of the product discharged through line 28 or the slurry introduced to the apparatus 2 through line 4, generally on an intermittent basis when the concentrator 2 is not being supplied with sufficient slurry to lubricate the bearing or the concentrator apparatus has been shut down or is being started up. Lubricant being supplied through line 32 passes through a pump 34 or other means for increasing the pressure thereof to form the same through the supply system to the bearing chamber 24. In the particular system described herein, pump 34 is a gear pump. The lubricant passing through pump 34 is then passed through conduit 36, on which is mounted an appropriate pressure indicator 38 and a pressure switch 39. To the extent that conduit 36 is long and there will be a tendency for the lubricant to solidify or accumulate if the temperature declines, line 36 can be steam traced or provided with an electrical resistance, wire heater 41. Conduit 36 supplies the polymeric lubricant to valve means 40, of the present invention. Valve means 40 is driven by drive motor 42 through gear box 44 and is appropriately opened and closed by means of electrical solenoid 46.

By way of specific example of the operation of the concentrator 2 of FIG. 1, the lubricant supply system will normally be inoperative during times that concentrator system 2 is fully operative and the lubricant supply system will be made operative at such times as insufficient feed materials are being introduced to consuntrator 2 to lubricate the bearing and bearing chamber 24 or during start-up of the concentrator system 2, to shorten the time necessary to get concentrator 2 on stream and protect the bearing system in bearing chamber 24. Obviously, when the lubricant supply system is inoperative, there will be a tendency for the lubricant (normally solid polymer) to solidify or accumulate and thus plug a conventional valve in the line supplying lubricant to the valve chamber 24 from a lubricant supply. In this specific instance, the pressure supplied through a pump 34 is insufficient to break or displace such a plug in valve. Accordingly, it is in such a situation that a valve means in accordance with the present invention is particularly useful.

Figure 2:
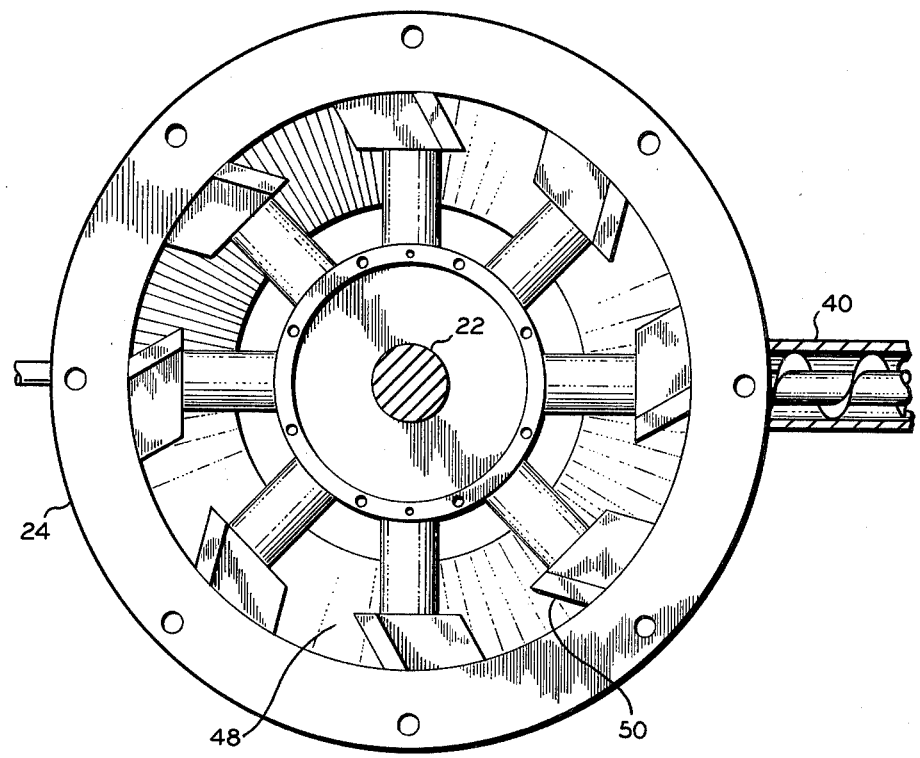
FIG. 2 is a partial top view of a bearing to be supplied with lubricant in accordance with the system of FIG. 1.
Figure 3:
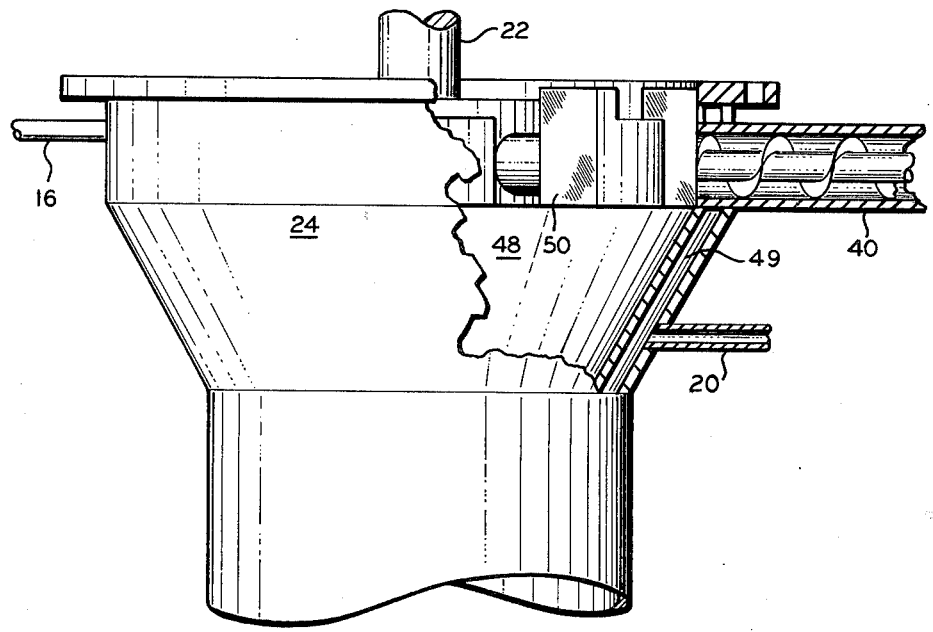
FIG. 3 is a side view, partially in section, of the bearing of FIG. 2.
Figures 4, 5:
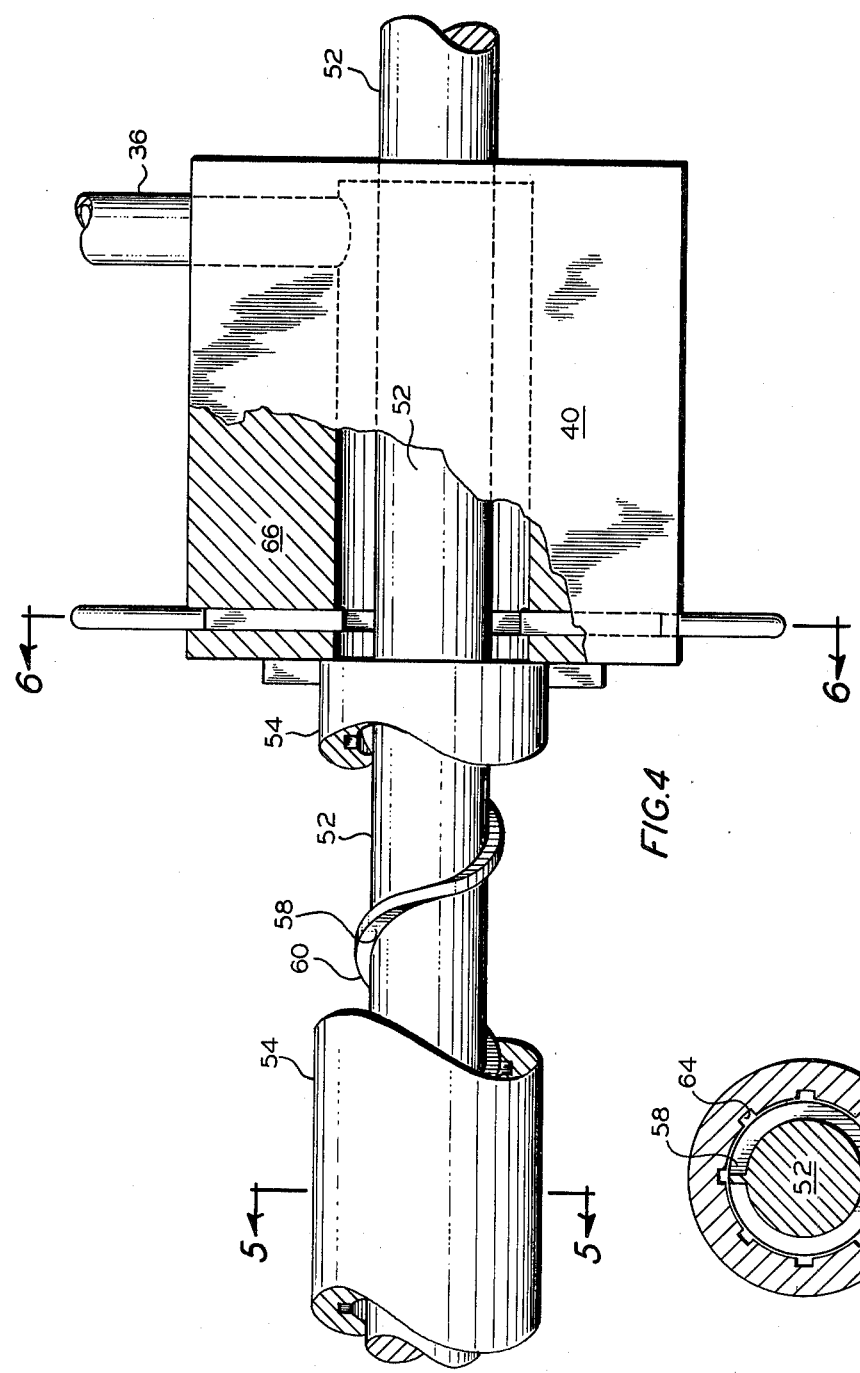
FIG. 4 is a side view, partially in section, of the valve means of the present invention.
FIG. 5 is a cross sectional view taken along line 5—5 of FIG. 4.

The FIGS. 2 and 3 of the drawings show the bearing chamber 24 of concentrator 2 in somewhat more detail; comprising, an inner bearing surface or race 48 and, a shoe type bearing 50 mounted on the bottom of the shaft 22 of concentrator apparatus 2. FIGS. 2 and 3 also show a jacket type heater 49 about bearing chamber 24 supplied with a suitable heating fluid through line 16 and out line 20. These figures also show the discharge end of valve means 40 for supplying lubricant to the bearing surface 48 adjacent bearing shoe 50.

Figure 7:
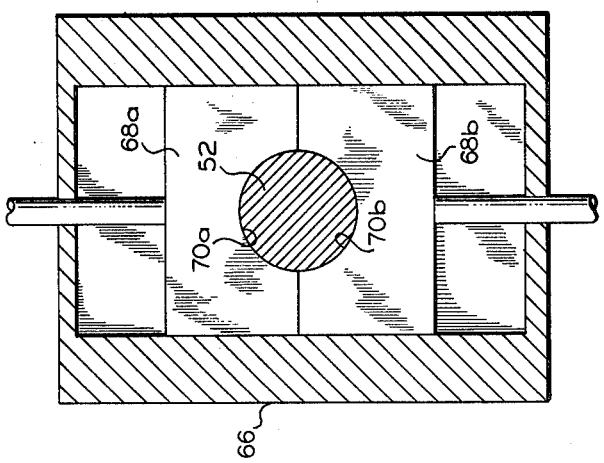
FIG. 7 is a partial cross sectional view corresponding to FIG. 6 and showing the valve means in a closed position.
Figure 6:
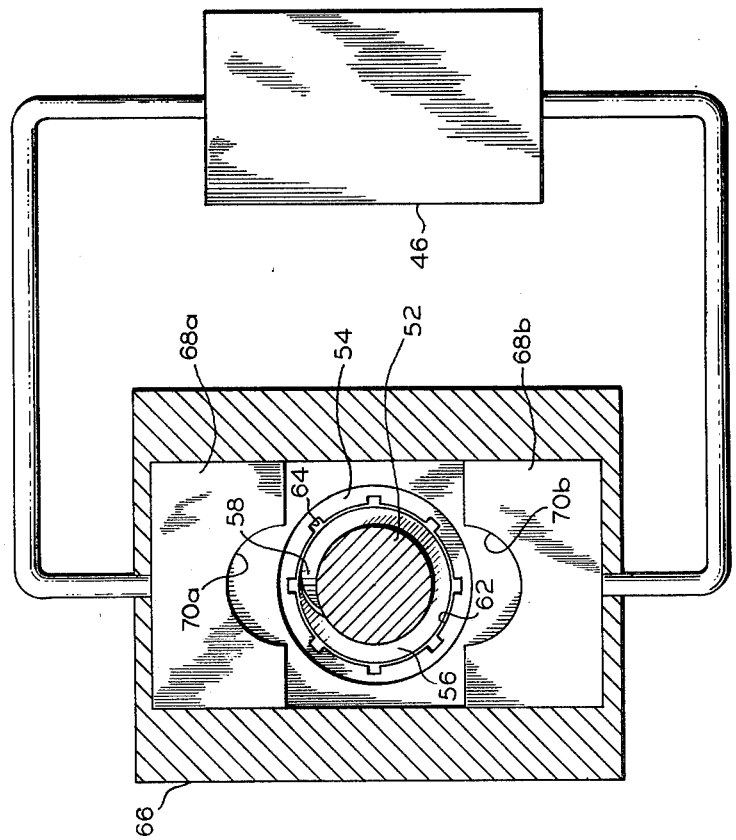
FIG. 6 is a cross sectional view taken along the line 6—6 of FIG. 4.

FIGS. 4 through 7 of the drawings illustrate, in detail, the valve means of the present application. Valve means 40 includes a centrally disposed rotatable shaft 52 which can be rotated by an appropriate drive means, such as motor 42 of FIG. 1. The downstream or discharge end of the valve 40 includes a housing 54, in the present case and elongated conduit surrounding shaft 50, having an internal diameter larger than the external diameter of shaft 52 and thereby forming an annular space 56. Formed on the exterior shaft 52 is a worm-type material transport means 58, which is in contact with the interior surface of housing 50 and adapted to transport materials from the upstream end of conduit 54 to the downstream end thereof through the annular space 56. In order to protect and/or improve the life of the valve means, and/or prevent contamination of the fluid passing through the valve by abraided metal particles form the worm-type transport means 58, the edge which is in contact with conduit 54 is provided with a coating or layer of a solid resin or polymeric material 60, such as polyphenylene, high density polyethylene, polychlorotriflorethylene, nylon, etc. Similarly, the interior surface of conduit 54 can be lined with a similar solid resin or plastic coating 62. In order to break up solids and prevent large lumps of material being accumulated in the annular space 56 and carried around by the worm-type transport 58, conduit 54 may be provided with rifling or appropriate longitudinally disposed grooves 64. Mounted immediately adjacent the upstream end of worm-type transfer means 58 and about shaft 52 is appropriate closure means 66. Closure means 66 includes two oppositely slidable door or gate-type means 68a and 68b, which are provided with semicircular cut outs 70a and 70b adapted to fit snugly about shaft 52 and open and close annular space 56 between shaft 52 and conduit 54. Any other appropriate closure means, such as, a gate valve of appropriate design, can also be utilized as a closure means 66. As previously indicated, the valve means of the present invention is opened and closed by solenoid 46. FIG. 6 of the drawings shows the closure means 66 in the open position so that lubricant or other material may flow through the valve means 40, as supplied by lubricant supply line 36 and through the annular space between shaft 52 and conduit 54. FIG. 7 shows the valve in its closed position thereby closing the annular space between shaft 52 and conduit 54.

Having described and illustrated the present invention by means of specific structures, modes of operation and use, it is to be understood that these specific details are included for purposes of illustration only, and are not to be considered limiting. Accordingly, anyone skilled in the art can readily perceive variations, equivalents and uses other than those specifically mentioned herein.

What is claimed is:

1. A material transport system for transporting a bulk material, comprising:
   (a) a conduit adapted to pass said bulk material from a source of supply to a utilization means;
   (b) a rotatable shaft passing through at least a portion of said conduit and having an outside diameter smaller than the inside diameter of said conduit to form an annular material transport space between said shaft and said conduit;
   (c) worm-type transport means formed on the outside of said shaft, extending to the interior surface of said conduit and adapted to transport said bulk material from the upstream end of said annular material transport space to the downstream end of said material transport space; and
   (d) closure means, mounted on said shaft adjacent said upstream end of said worm-type transport means, including two oppositely-disposed, slidable closures, each having a semicircular cut-out adapted to fit over half of said shaft and, when closed in center-to-center relation, adapted to completely surround said shaft;
   (e) said closure means being adapted to open and close said annular material transport space between said shaft and said conduit while permitting said shaft to rotate when said closure means is closed.

2. A material transport system in accordance with claim 1 wherein the portion of the conduit surrounding the worm-type transport means has formed therein at least one generally longitudinally-disposed groove.

3. A material transport system in accordance with claim 1 or claim 2 wherein at least one of the inner surface of the conduit and the outer surface of the worm-type transport means has formed thereon a wear-resistant plastic where the surfaces of said conduit and said worm-type transport means contact one another.

4. A material transport system in accordance with claim 1 wherein the closure means is a gate-type valve means.

5. A material transport system in accordance with claim 1 wherein the downstream end of the conduit and the shaft terminate adjacent the utilization means and the worm-type transport means formed on said shaft terminates coincidentally with said downstream end of said conduit and said shaft.

6. A material transport system in accordance with claim 1 which additionally includes motive means operatively connected to the shaft and adapted to rotate said shaft.

7. A material transport system in accordance with claim 1 which additionally includes pump means mounted between the source of material supply and the closure means.

8. A material transport system in accordance with claim 1 to transport a normally non-fluent material in fluent condition.

9. A material transport system in accordance with claim 8 wherein the normally non-fluent material is a normally solid plastic in a heated, fluent condition.

10. A material transport system in accordance with claim 9 wherein the utilization means is adapted to be heated to a temperature sufficient to maintain the plastic in a fluent condition.

11. A material transport system for transporting a bulk material, comprising:
   (a) a conduit adapted to pass said bulk material from a source of supply to a utilization means;
   (b) a rotatable shaft passing through at least a portion of said conduit and having an outside diameter smaller than the inside diameter of said conduit to form an annular material transport space between said shaft and said conduit;
   (c) worm-type transport means formed on the outside of said shaft, extending to the interior surface of said conduit and adapted to transport said bulk material from the upstream end of said annular material transport space to the downstream end of said material transport space;
   (d) closure means mounted on said shaft adjacent said upstream end of said worm-type transport means and adapted to open and close said annular material transport space between said shaft and said conduit while permitting said shaft to rotate when said closure means is closed; and (e) closure operating means operatively connected to said closure means and adapted to automatically open and close said closure means.

12. A material transport system in accordance with claim 11 wherein the portion of the conduit surrounding the worm-type transport means has formed therein at least one generally longitudinally-disposed groove.

13. A material transport system in accordance with claim 11 or claim 12 wherein at least one of the inner surface of the conduit and the outer surface of the worm-type transport means has formed thereon a wear-resistant plastic where the surfaces of said conduit and said worm-type transport means contact one another.

14. A material transport system in accordance with claim 11 wherein the closure means includes two oppositely-disposed, slideable closures, each having a semicircular cut-out adapted to fit over half of the shaft and when closed in center-to-center relation, adapted to completely surround said shaft.

15. A material transport system in accordance with claim 14 wherein the closure means is a gate-type valve means.

16. A material transport system in accordance with claim 11 wherein the downstream end of the conduit and the shaft terminate adjacent the utilization means and the worm-type transport means formed on said shaft terminates coincidentally with said downstream end of said conduit and said shaft.

17. A material transport system in accordance with claim 11 which additionally includes motive means operatively connected to the shaft and adapted to rotate said shaft.

18. A material transport system in accordance with claim 11 wherein the closure operating means is a solenoid.

19. A material transport system in accordance with claim 11 which additionally includes pump means mounted between the source of material supply and the closure means.

20. A material transport system in accordance with claim 11 to transport a normally non-fluent material in fluent condition.

21. A material transport system in accordance with claim 20 wherein the normally non-fluent material is a normally solid plastic in a heated, fluent condition.

22. A material transport system in accordance with claim 21 wherein the utilization means is adapted to be heated to a temperature sufficient to maintain the plastic in a fluent condition.

* * * * *